(12) United States Patent
Hiraki et al.

(10) Patent No.: US 6,938,499 B2
(45) Date of Patent: Sep. 6, 2005

(54) LOAD DETECTING DEVICE FOR A VEHICULAR SEAT

(75) Inventors: Yasuaki Hiraki, Nisshin (JP); Hitoshi Takayanagi, Chiryu (JP); Katsu Hattori, Nagoya (JP); Chiaki Sumi, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/128,424

(22) Filed: Apr. 24, 2002

(65) Prior Publication Data

US 2002/0178839 A1 Dec. 5, 2002

(30) Foreign Application Priority Data

Apr. 24, 2001 (JP) .......................................... 2001-125989

(51) Int. Cl.[7] .................................................. G01D 7/00
(52) U.S. Cl. .................................................. 73/862.046
(58) Field of Search ...................... 73/862.632, 862.637, 73/862.046, 767; 177/1; 364/571

(56) References Cited

U.S. PATENT DOCUMENTS

| | | | | |
|---|---|---|---|---|
| 4,745,565 A | * | 5/1988 | Garwin et al. | ................ 702/95 |
| 5,905,209 A | | 5/1999 | Oreper | |
| 5,991,676 A | * | 11/1999 | Podoloff et al. | .............. 701/45 |
| 6,345,839 B1 | * | 2/2002 | Kuboki et al. | ............. 280/735 |
| 6,346,680 B1 | * | 2/2002 | Takahashi et al. | ............. 177/1 |
| 6,546,817 B1 | * | 4/2003 | Aoki | ..................... 73/862.474 |

* cited by examiner

*Primary Examiner*—Max Noori
*Assistant Examiner*—Jewel V. Thompson
(74) *Attorney, Agent, or Firm*—Burns, Doane, Swecker & Mathis, LLP

(57) ABSTRACT

A load detecting device includes a plurality of load sensors which are disposed in a matrix shape and correcting means for setting at least one of the plural load sensors as a standard load sensor and for correcting level of output values of each load sensors to level of output value of the standard load sensor on the basis of the output values of each load sensors.

7 Claims, 6 Drawing Sheets

LOAD DETECTING DEVICE FOR A VEHICULAR SEAT

CROSS REFERENCE TO RELATED APPLICATIONS

This application is based on and claims priority under 35 U.S.C. § 119 with respect to a Japanese Patent Application 2001-125989, filed on Apr. 24, 2001, the entire content of which is incorporated herein by reference.

FIELD OF THE INVENTION

This invention relates to a load detecting device. More particularly, this invention pertains to a load detecting device having a plurality of load sensors which are disposed in a matrix shape.

BACKGROUND OF THE INVENTION

A load detecting device which has a plurality of load sensors disposed in a matrix shape and which detects a distribution of the loads applied on a face on the basis of outputted values of each load sensors is already known in, for example, U.S. Pat. No. 5,905,209. A sensor in which a resistor changes in response to the applied load is adopted as the load sensor. In this case, for example, a current value which passes the load sensor is changed on the basis of the resistor changing in response to the load and this current value is transformed into a voltage value. Then, the voltage value changing in response to the load is fed to a central processing unit of a controller as an A/D (analog/digital) value through an A/D converting circuit of the controller. In general, a relationship between the load value applied to the load sensor and the above A/D value is all-inclusively represented by a predetermined calculation formula which corresponds to a structure of a circuit and the central processing unit obtains the load value on the basis of the calculation formula.

In case of that a plurality of load sensors are disposed in a matrix shape, however, generally scattering is in existence in a characteristic of each load sensors. Thereby, a distribution of the loads which is detected by the load detecting device becomes inaccurate.

A need exists for a load detecting device which can absorb scattering of the characteristics of plural load sensors disposed in a matrix shape.

SUMMARY OF THE INVENTION

A load detecting device comprises a plurality of load sensors which are disposed in a matrix shape and correcting means for setting at least one of the plural load sensors as a standard load sensor and for correcting level of output values of each load sensors to level of output value of the standard load sensor on the basis of the output values of each load sensors.

Further, according to another aspect of the present invention, a load detecting device comprises a plurality of load sensors which are disposed in a matrix shape and in which the load sensors in a standard line are set and correcting means for correcting level of output values of each load sensors to level of output value of the load sensors in the standard line on the basis of the output values of each load sensors.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Having generally described the present invention, a further understanding of the invention can be obtained now according to an embodiment of the present invention with reference to FIGS. 1 to 7 in accompanying drawings.

Figure 1:
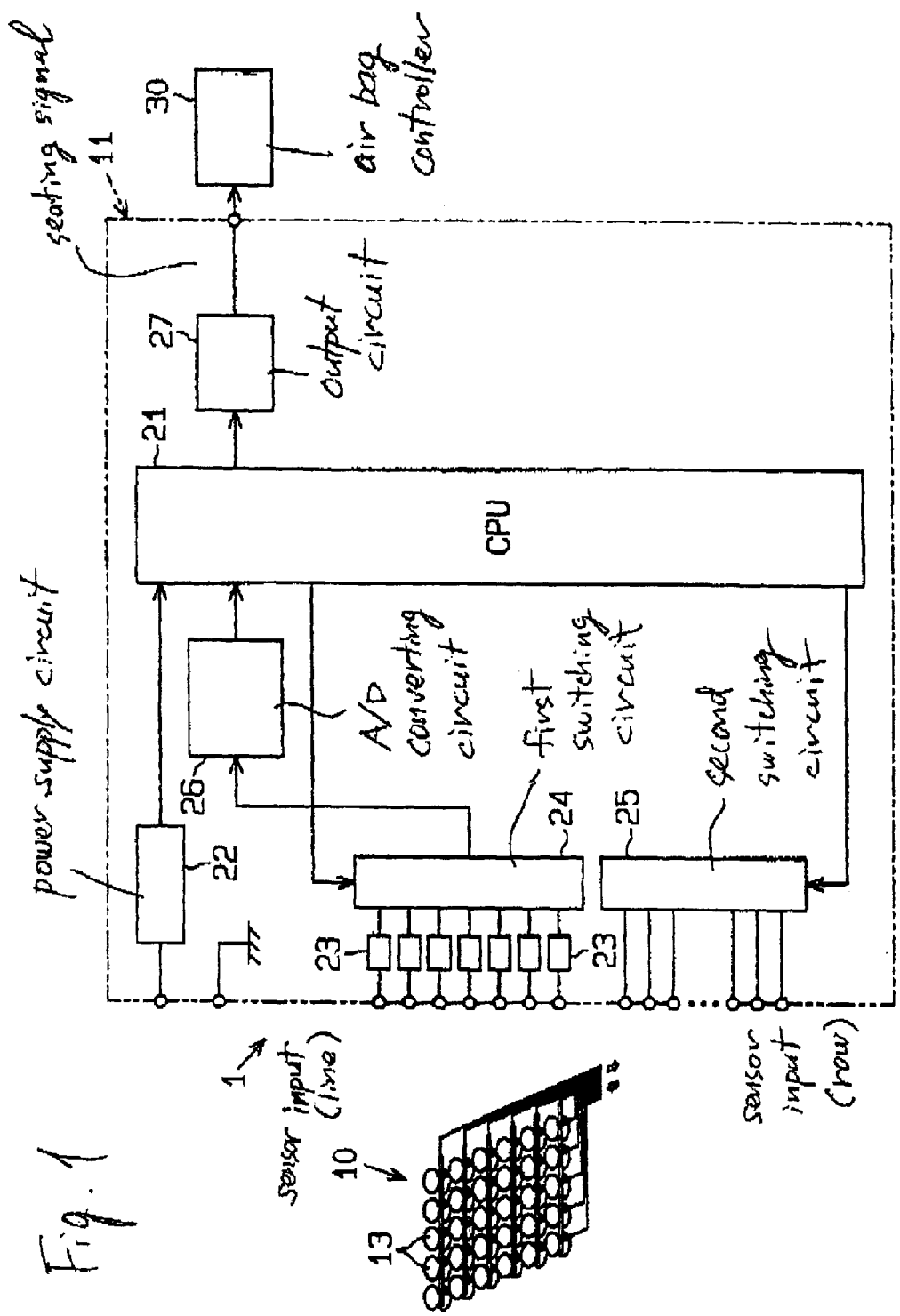
FIG. 1 is a block view schematically illustrating an electric structure of an embodiment of a load detecting device in accordance with the present invention.

FIG. 1 illustrates a block view of an electric structure of a seating condition determination device 1 to which the present invention is applied. As shown in FIG. 1, the seating condition determination device 1 includes a load detecting part 10 and a controller 11.

Figure 2:
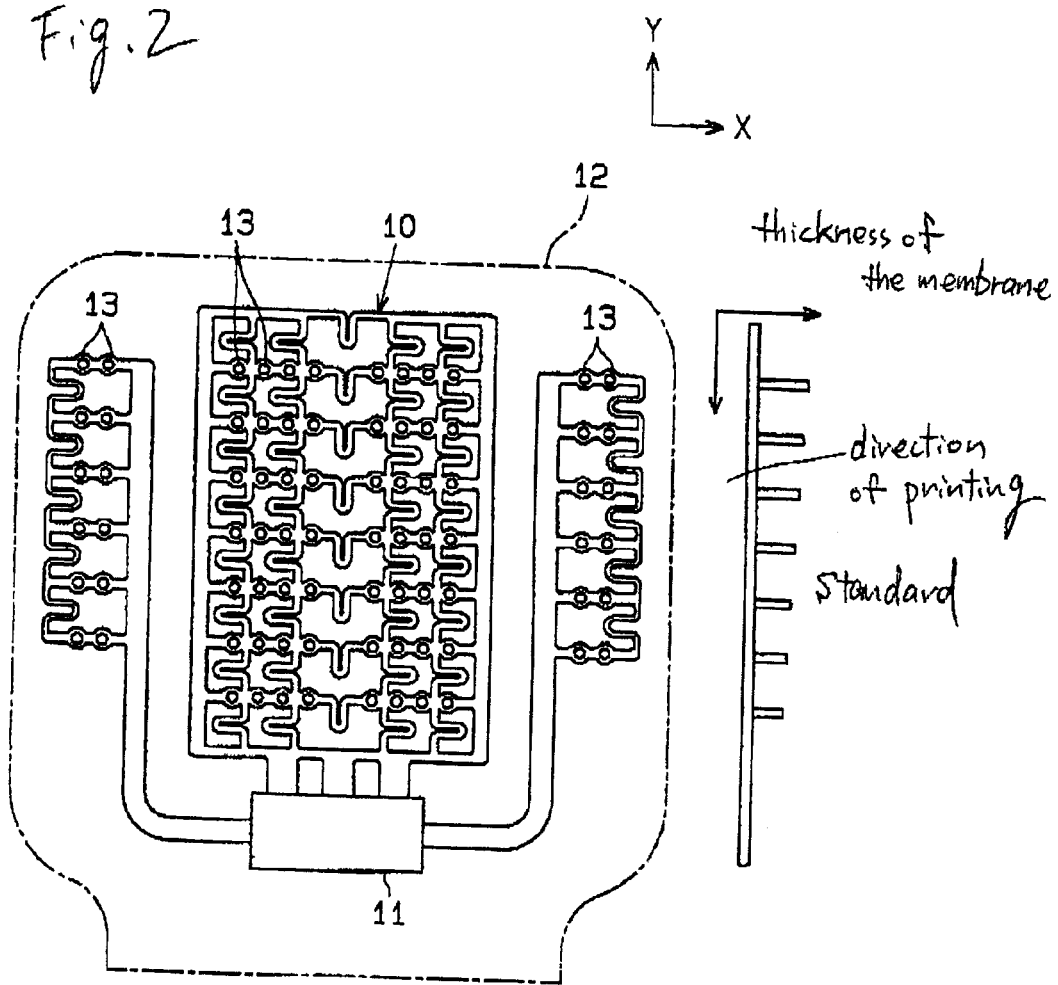
FIG. 2 is a plan view of a load detecting part of an embodiment a load detecting device in accordance with the present invention.

As shown in FIG. 2, the load detecting part 10 is accommodated in a seat surface of a vehicular seat (seat cushion) 12. The load detecting part 10 has a structure including cells 13 which are disposed as load sensors on each locations on a surface defined by lines (i line) extending in the width direction (X direction) of the vehicular seat 12 and rows (j row) extending in back and forth direction (Y direction) of the vehicular seat 12. In this embodiment, 80 pieces of cell 13 are disposed in a matrix having 7 lines and 12 rows on the vehicular seat 12. 4 pieces of cell 13 which are located at both rear ends are removed. The number of cell is not limited to this embodiment.

Each cells 13 constitute a well known load sensor in which the resistance value is changed in response to the applied load. The signals (output values) of these cells 13 which correspond to each resistance values are fed to the controller 11. The controller 11 detects the load values applied to each location on the basis of each signals.

These cells 13 are formed by screen printing which prints, for example, in the printing direction (−Y direction) shown in FIG. 2. According to the general characteristic of the screen printing, the thickness of the membrane of each cells 13 becomes thinner in turn from the starting side toward the ending side in the printing direction. Accordingly, scattering which depends on the location of each cells 13, namely the location of the low generates in a changing characteristic of the resistance value with respect to the load value among each cells 13.

As shown in FIG. 1, the controller 11 which is connected to the load detecting part 10 includes a CPU (central processing unit) 21, a power supply circuit 22, an input circuit 23, a first switching circuit 24, a second switching circuit 25, an A/D (analog/digital) converting circuit 26 and an output circuit 27.

The CPU 21 performs a judgment of the seating condition of the vehicular seat 12 in accordance with a control program and initial data memorized in a ROM (read only memory) in advance. The power supply circuit 22 transforms the power supply (for example, 12V) supplied from a battery (not shown) to a predetermined voltage (for example, 5V) and supplies this transformed power supply to the CPU 21 as a power supply.

The input circuit 23 is provided on each lines of the cells 13 of the load detecting part 10, respectively. One end of the cell 13 in each lines is connected to the input circuit 23 and is connected to the first switching circuit 24 through the input circuit 23.

The first switching circuit 24 is connected to the load detecting part 10 through each input circuits 23. The first switching circuit 24 switches selectively the line of the cells 13 of the load detecting part 10 by a switching signal from the CPU 21 and connects the line of the cells 13 to the A/D converting circuit 26. On the other hand, the second switching circuit 25 is connected to the load detecting part 10. The second switching circuit 25 switches selectively the row of the cells 13 of the load detecting part 10 by a switching signal from the CPU 21 and connects the row of the cells 13 to the ground. Accordingly, only the signals from the cells 13 in the line and row which is selectively switched are fed to the A/D converting circuit 26.

Figure 3:
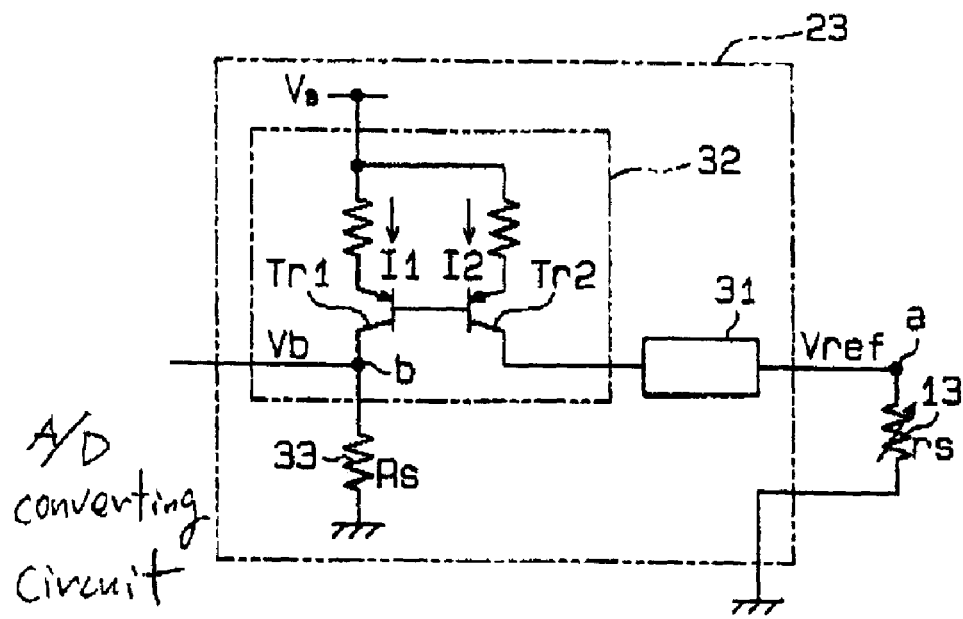
FIG. 3 is an electric circuit of an embodiment of a load detecting device in accordance with the present invention.

The A/D converting circuit 26 converts the above signals from the cells 13 from analog signal into digital signal and fed it as an A/D value to the CPU 21. FIG. 3 show a circuit illustrating equivalently with respect to the cell 13 of the line and row selected by the first and second switching circuits 24, 25. In this embodiment, the resistance value of this selected cell 13 are shown by rs (i, j). As shown in FIG. 3, one end of the cell 13 is connected at a connecting point a to the A/D converting circuit 26 of the controller 11 through the input circuit 23 (and the first switching circuit 24). The other end of the cell 13 is connected to the ground through the second switching circuit 25.

The input circuit 23 includes a constant voltage source 31, current mirror circuit 32 and a sensitivity resistance 33. The constant voltage source 31 maintains an electrical potential within a predetermined standard electrical potential Vref. The current mirror circuit 32 equalizes the current value I1 passing in a transistor Tr1 with the current value I2 passing in a transistor Tr2 approximately. Accordingly, since the electrical potential is always maintained within the standard electrical potential Vref by the constant voltage source 31, each current values I1 and I2 passing in the transistors Tr1 and Tr2 change in response to the resistance value rs (i, j). Namely, the current values I1 and I2 are calculated by the following formula (1).

$$I1 = I2 = Vref/rs \tag{1}$$

One end of the sensitivity resistance 33 is connected at a connecting point b to the transistor Tr1 of the current mirror circuit 32 and the other end thereof is connected to the ground. If the resistance value of the sensitivity resistance 33 is a predetermined resistance value Rs, the electrical potential Vb at the connecting point b is calculated by the following formula (2).

$$Vb = Rs \times I1 \tag{2}$$

Then, the following formula (3) is obtained by the formulas (1) and (2).

$$Vb = Rs \times I1 = Vref \times Rs/rs \tag{3}$$

Figure 6:
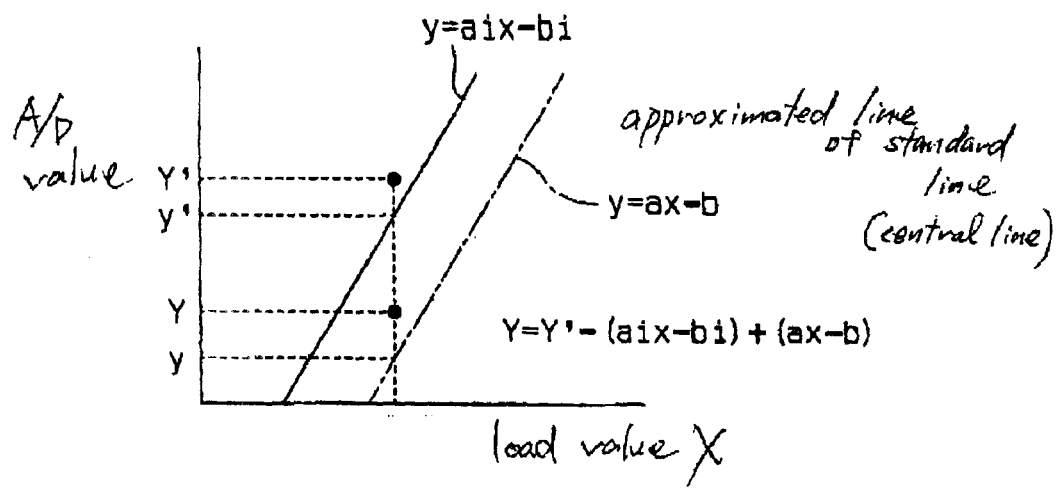
FIG. 6 is a graph illustrating a relationship between a load value and A/D value according to an embodiment of the present invention.

The electrical potential Vb at the connecting point b is fed to the CPU 21 as the A/D value Y' (i, j). In this embodiment, the characteristic between the applied load and the A/D value y in all cells 13 disposed in the line i is shown approximately by the following formula (4) which is shown in FIG. 6 by a solid line.

$$y = ai \times (\text{load value}) - bi \tag{4}$$

The inclination ai and the intercept bi of the formula (4) are set by the A/D value which is obtained experimentally with respect to the load value in each cells 13. The inclination ai and the intercept bi are obtained by rectilinear approximation based on the minimum square method. Further, the CPU 21 memorizes A/D value y' (i, j) which approximates the i line with respect to the inputted A/D value Y' (i, j). In other words, the CPU 21 can calculate the A/D value y' (i, j) on the straight line which approximates the i line on the basis of the A/D value Y' (i, j) inputted from a predetermined cell 13 of the i line. For example, the CPU 21 calculates the A/D value y' (i, j) by a map or a table based on the A/D value Y' (i, j) of the cell 13. The CPU 21 substitutes the calculated A/D y' (i,j) for the formula (4) and obtains the load value applied to the cell 13.

In this embodiment, it is regarded that the central line (forth line) has a standard characteristic. The characteristic between the applied load value and the A/D value y of the cells 13 which are disposed in the fourth line is expressed approximately by the following formula (5) shown in FIG. 6 by a dotted line.

$$y = a \times (\text{load value}) - b \tag{5}$$

The inclination a and the intercept b of the formula (5) are also set by the A/D value which is obtained experimentally with respect to the load value in each cells 13 disposed in the fourth line. In the screen printing, the cells 13 of the central line which is located at the center with respect to the printing direction have most stable characteristic and are set as the standard cells. The CPU 21 substitutes the load value obtained based on the formula (4) for the formula (5) and obtains the A/D value y (i, j) on the straight line in which the cells 13 in the central line are standard.

In this embodiment, the A/D value Y' (i, j) inputted from the predeterrmined cells 13 of the i line is corrected by the deviation between the A/D value y' (i, j) located on a straight line approximating the i line and the A/D value y (i, j) located on a straight line approximating the standard line. Thereby, the scattering of the A/D value Y' (i, j) of the predetermined cells 13 with respect to the A/D value of the standard line is absorbed. Namely, if the corrected A/D value of the predetermined cells 13 of the i line under the condition which the scattering is absorbed is Y (i, j), Y is shown by the following formula (6).

$$Y = Y' - y' + y \tag{6}$$
$$= Y' - y' + a \times (\text{load value}) - b$$

Further, if the load value by the formula (4) is substituted for the formula (6), the Y is shown by the following formula (7).

$$Y = Y' - y' + y \tag{7}$$
$$= Y' - y' + a \times ((y' + bi)/ai) - b$$

Figure 7:
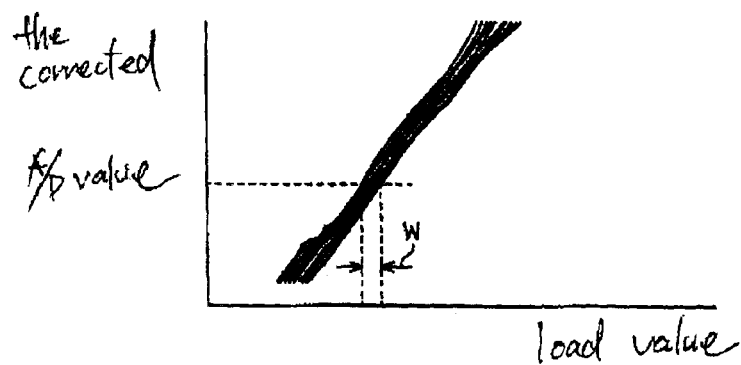
FIG. 7 is a graph illustrating a relationship between a load value and A/D value obtained experimentally according to an embodiment of the present invention.

FIG. 7 shows a relationship between the load value and the corrected A/D value Y (i, j) which corrected the A/D value Y' (i, j) of all cells 13 on the basis of the formula (7). This relationship is obtained by the experimentation. In FIG. 7, as shown as a divergence w with respect to the predetermined A/D value, the scattering of the corrected A/D value with respect to the load value is decreased.

The CPU 21 performs a threshold value judgment and so on based on the corrected A/D value Y (i, j). The CPU 21 performs a judgment of the seating condition of the vehicular seat 12 on the basis of the result of the threshold value judgment.

The output circuit 27 is connected to the CPU 21 and signals showing the seating condition of the vehicular seat 12 and so on are fed from the CPU 21. The output circuit 27 is connected to an air bag controller 30 and outputs the seating conditions and so on judged by the CPU 21 as a seating signal to the air bag controller 30. The air bag controller 30 operates an air bag for a driver seat or a passenger seat on the basis of the seat signal and a signal from a collision sensor (not shown). Especially, there are various cases in the seating condition of the passenger seat of the vehicular seat 12, for example, an adult is seated, a child is seated, a child seat is mounted, or nothing on the seat. The air bag controller 30 receives the seating signal corresponding to each cases and controls the operation of the air bag for passenger seat suitably.

Figure 4:
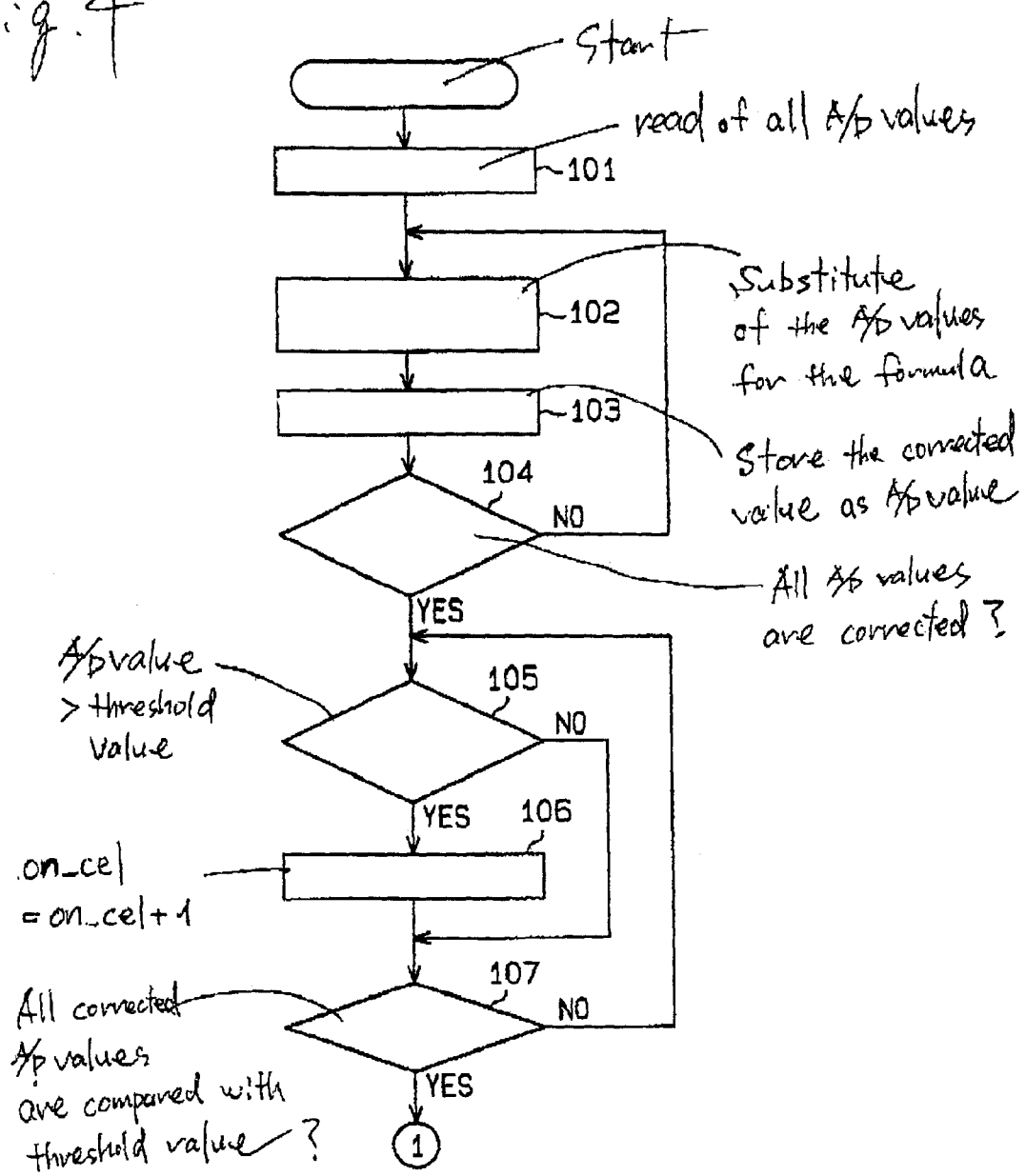
FIG. 4 and FIG. 5 are flow charts showing routines for determining whether a passenger is sitting on a seat or whether the seated passenger is an adult or a child according to an embodiment of the present invention.

A routine for determining a passenger in the seating condition determination device 1 will now be described with reference to a flow chart shown in FIGS. 4 and 5. This routine is performed with a predetermined interval as interrupt handling. When the routine begins to start, the CPU 21 reads in step 101 the A/D values Y' (i, j) inputted from each cells 13 of the load detecting part 10 and proceeds to step 102.

In step 102, the CPU 21 calculates A/D values y' (i, j) located on the straight line approximating the i line on the basis of the A/D values Y' (i, j) of each cells 13. Then, the CPU 21 substitutes the A/D values Y' (i, j) and the A/D values y' (i, j) for the above formula (7) and calculates the corrected A/D values Y (i, j) of each cells 13. Then the CPU 21 stores the corrected A/D values Y (i, j) as substantially A/D values for various processing in step 103.

Next, the CPU 21 proceeds to the step 104 and judges whether the calculation and the storing of the corrected A/D values Y (i, j) is completed for all cells 13. Then, when it is judged that the calculation and the storing of the corrected A/D values Y (i, j) is not completed for all cells 13, the CPU 21 repeats the processes in steps 102 and 103 until the calculation and the storing of the corrected A/D values Y (i, j) is completed. When it is judged that the calculation and the storing of the corrected A/D values Y (i, j) is completed for all cells 13, the CPU 21 proceeds to step 105.

In step 105, the CPU 21 judges whether the corrected A/D values Y (i, j) in each cells 13 exceed the predetermined threshold value or not. Then, in case that the whether the corrected A/D values Y (i, j) exceed the predetermined threshold value, the CPU 21 proceeds to step 106 and increases the number of ON cell on_cel by adding [1]. Then, the CPU 21 proceeds to the step 107. The number of ON cell on_cel corresponds to the number of the cells in which the corrected A/D values Y (i, j) exceed the predetermined threshold value. On the other hand, when the corrected A/D values Y (i, j) do not exceed the predetermined threshold value, the step 107 is performed.

In step 107, the CPU 21 judges whether the comparison between the corrected A/D values Y (i, j) and the threshold value is completed for all cells 13. When it is judged that the comparison between the corrected A/D values Y (i, j) and the threshold value is not completed for all cells 13, the CPU 21 repeats the processes of the steps 105 and 106 until the comparison is completed and renews the number of ON cell. Then, when it is judged that the comparison between the corrected A/D values Y (i, j) and the threshold value is completed for all cells 13, the CPU 21 stores the number of ON cell renewed in step 106 as the last number of ON cell. This number of ON cell is used for the judgment of the seating condition and so on of the vehicular seat 12. Namely, the number of ON cell shows characteristic which corresponds to the seating conditions, for example, an adult or a child is seated, a child seat is mounted, or nothing on the seat.

Figure 5:
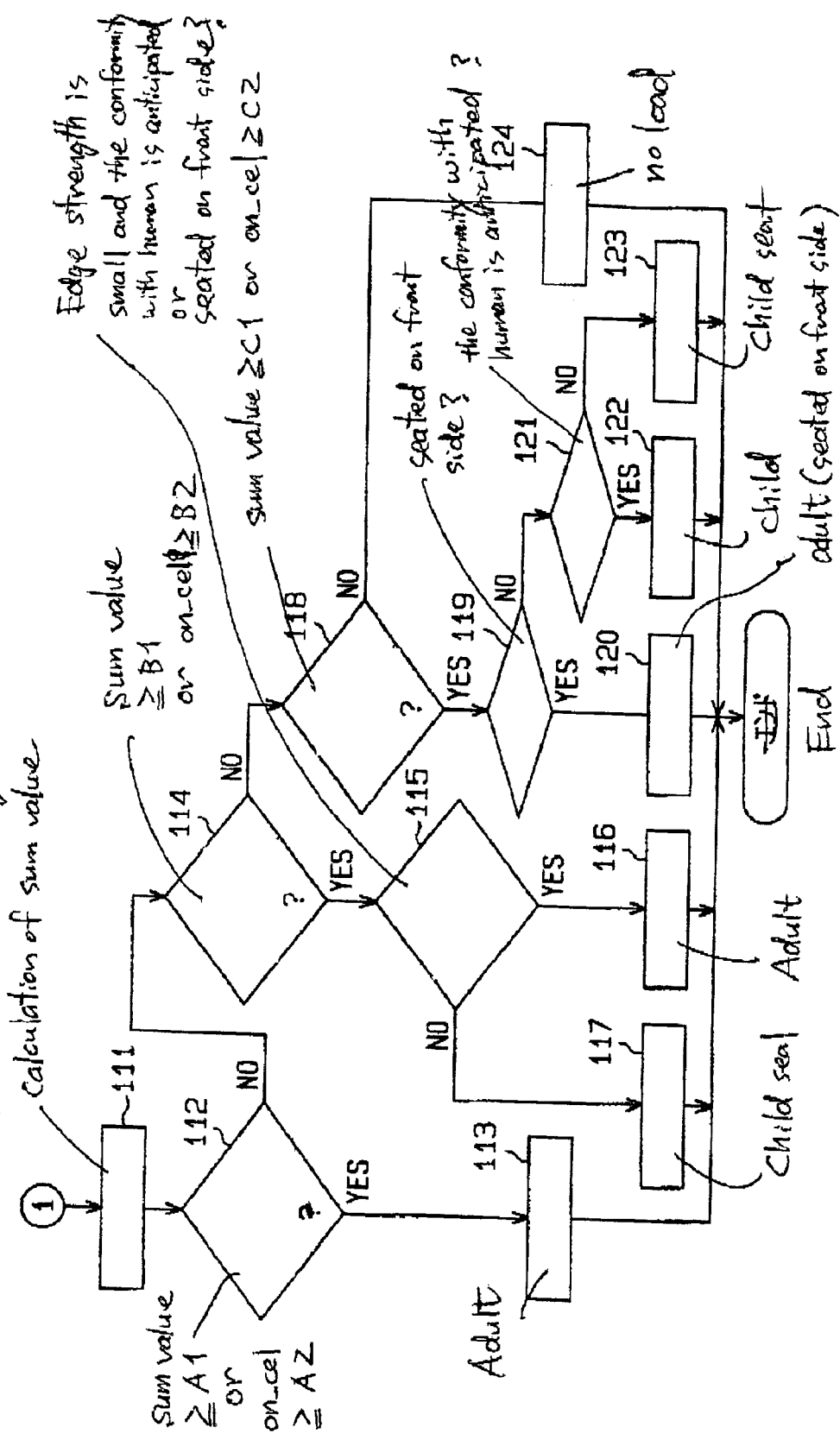

When it is judged in step 107 that whether the comparison between the corrected A/D values Y (i, j) and the threshold value is completed for all cells, the CPU 21 proceeds to step 111 in FIG. 5. In step 111, the CPU 21 calculates the sum of the corrected A/D values Y (i, j) of all cells 13 and stores the sum value. This sum value is also used for the judgment of the seating condition and so on of the vehicular seat 12. Namely, the sum value also shows characteristic which corresponds to the seating conditions.

Next, the CPU 21 proceeds to the step 112 and judges whether the sum value is more than a predetermined value A1 or the number of ON cell on_cel is more than a predetermined value A2. In general, when an adult is seated on the vehicular seat 12, in comparison with the other cases (child, child seat, and son), the sum value or the number of ON cell on_cel shows a certain measure of value or number. The above predetermined values A1 and A2 are set to values which are suitable for sorting the various seating conditions.

When it is judged that the sum value is more than the predetermined value A1 or the number of ON cell on_cel is more than the predetermined value A2, the CPU 21 proceeds to the step 113 and judges that an adult is seated. The CPU 21 stores this result of the judgment in the memory and terminates subsequent process once. On the other hand, when it is judged that the sum value is less than the predetermined value A1 or the number of ON cell on_cel is less than the predetermined value A2, the CPU 21 proceeds to the step 114.

In step 114, the CPU 21 judges whether the sum value is more than a predetermined value B1 or the number of ON cell on_cel is more than a predetermined value B2. The predetermined value B1 is smaller than the value A1 and the predetermined value B2 is smaller than the value A2. In general, when an adult is seated on the vehicular seat 12 or a child seat is mounted, in comparison with the other cases (child, and son), the sum value or the number of ON cell on_cel shows a certain measure of value or number. The above predetermined values B1 and B2 are set to values which are suitable for sorting the various seating conditions.

When it is judged that the sum value is more than the predetermined value B1 or the number of ON cell on_cel is more than the predetermined value B2, the CPU 21 proceeds to the step 115. In step 115, the CPU 21 judges whether an edge strength is small and the conformity with human is anticipated or whether an adult is seated on a front side of the vehicular seat 12.

The meaning of the edge strength is described as follows. In general, in comparison with the case which the human is seated on the vehicular seat 12, when the child seat is mounted on the vehicular seat 12, sudden change generates between the corrected A/D values Y (i, j) of the predetermined cells 13 and the corrected A/D values Y (i, j) of the cells being adjacent to the predetermined cells 13. Because the child seat is hard in comparison with the soft human body and the remarkable load variation generates at the contacting portion between the child seat and the vehicular seat by the tightening of the seat belt. Accordingly, the degree of this load variation gives suggestions that the child seat is mounted. The edge strength expresses the degree of the load variation numerically by well known method. When the edge strength is small, since the load variation is small, the CPU 21 judges that the human is seated. When the edge strength is large, since the load variation is large, the CPU 21 judges that the child seat is mounted.

Next, the meaning of the conformity with human is described as follows. In general, the characteristic of the distribution on the seat 12 of the corrected A/D values Y (i, j) of all cells 13 under the condition which the human is seated on the vehicular seat 12 is differ from that under the condition that the child seat is mounted on the vehicular seat 12. For example, in case that the human is seated on the vehicular seat 12, the cells 13 which are located at relatively central portion of the seat 12 show a certain level of corrected A/D values Y (i, j). On the other hand, in case that the child seat is mounted on the seat 12, the cells 13 which are located at relatively periphery side of the seat 12 show a certain level of corrected A/D values Y (i, j). Accordingly, the tendency of the distribution of the corrected A/D values Y (i, j) on the seat 12 gives suggestions that the child seat is mounted.

Further, the characteristic of the distribution on the seat 12 of the corrected A/D values Y (i, j) of all cells 13 is remarkably changed by the location where the human is seated. For example, when the human is seated on a front side of the vehicular seat 12, the cells 13 which are located at relatively front portion of the seat 12 show a certain level of corrected A/D values Y (i, j). Accordingly, the tendency of the distribution of the corrected AND values Y (i, j) on the seat 12 gives suggestions that the human is seated on a front side of the vehicular seat 12.

In step 115, when it is judged that the edge strength is small and the conformity with human is anticipated or that an adult is seated on a front side of the vehicular seat 12, the CPU 21 proceeds to the step 116 and judges that the adult is seated. The CPU 21 stores this result of the judgment in the memory and terminates subsequent process once. On the other hand, when it is judged that that the edge strength is large and the conformity with human is not anticipated or that an adult is not seated on a front side of the vehicular seat 12, the CPU 21 proceeds to the step 117 and judges that the child seat is mounted. The CPU 21 stores this result of the judgment in the memory and terminates subsequent process once.

Further, in step 114, when it is judged that the sum value is less than the predetermined value B1 or the number of ON cell on_cel is less than the predetermined value B2, the CPU 21 proceeds to the step 118.

In step 118, the CPU 21 judges whether the sum value is more than a predetermined value C1 or the number of ON cell on_cel is more than a predetermined value C2. The predetermined value C1is smaller than the value B1 and the predetermined value C2 is smaller than the value B2. In general, when an adult or a child is seated on the vehicular seat 12 or a child seat is mounted, in comparison with the other case (nothing on the seat), the sum value or the number of ON cell on_cel shows a certain measure of value or number. The above predetermined values C1 and C2 are set to values which are suitable for sorting the various seating conditions.

When it is judged that the sum value is more than the predetermined value C1 or the number of ON cell on_cel is more than the predetermined value C2, the CPU 21 proceeds to the step 119. In step 119, the CPU 21 judges whether an adult is seated on a front side of the vehicular seat 12. When it is judged that an adult is seated on the front side of the vehicular seat 12, the CPU 21 proceeds to the step 120 and judges that an adult is seated on the seat 12. The CPU 21 stores this result of the judgment in the memory and terminates subsequent process once.

On the other hand, when it is judged that an adult is not seated on a front side of the vehicular seat 12, the CPU 21 proceeds to the step 121 and judges whether the conformity with human is anticipated. When it is judged that the conformity with human is anticipated, the CPU 21 proceeds to the step 122 and judges that a child is seated on the seat 12. The CPU 21 stores this result of the judgment in the memory and terminates subsequent process once. Further, when it is judged that the conformity with human is not anticipated, the CPU 21 proceeds to the step 123 and judges that the child seat is mounted. The CPU 21 stores this result of the judgment in the memory and terminates subsequent process once.

Further, in step 118, when it is judged that the sum value is less than the predetermined value C1 or the number of ON cell on_cel is less than the predetermined value C2, the CPU 21 proceeds to the step 124. In step 124, the CPU 21 judges that the seat 12 is in no load condition (nothing on the seat 12). The CPU 21 stores this result of the judgment in the memory and terminates subsequent process once.

The CPU 21 feeds the results of the judgments in steps 113, 116, 117, 120, 122 to 124 as seating signals to the air bag controller 30 through the output circuit 26. The air bag controller 30 controls the operation of the air bag suitably in response to the seating signals.

As described above, according to this embodiment, the level of A/D value Y' (i, j) of each cells 13 is corrected to the level of A/D value of the cells 13 of the standard line (the corrected A/D value Y (i, j)) on the basis of the A/D value Y' (i, j) of each cells 13. Thereby, it is able to absorb the scattering of the characteristic of each cells 13 and it is able to improve the accuracy of the detecting of the load detecting device.

Further, in this embodiment, the number of ON cell on_cel and the sum value are calculated based on the corrected A/D values Y (i, j). Therefore, it is able to perform the judgment of the seating conditions and so on suitably.

Further, it is possible to modify the above described embodiment. For example, it is able to obtain the corrected A/D value Y (i, j) by the calculation of the load value in the formula (4) from a table or a map on the basis of the A/D value Y' (i, j) from the predetermined cells 13. Further, it is able to obtain the corrected A/D value Y (i, j) directly from a table or a map on the basis of the A/D value Y' (i, j) from the predetermined cells 13.

Further, the A/D value Y' (i, j) inputted from the predeterrmined cells 13 may be corrected by the deviation between the A/D value Y' (i, j) and the A/D value of the predetermined standard cells. Thereby, it is able to absorb the scattering between the A/D value Y' (i, j) and the A/D value of the predetermined standard cells. In this case, the cells which are located at approximately central portion of the seat may be use as the standard cells.

Further, the relationship between the load value and the A/D value may be shown by the other formulas. In this embodiment, the load sensor is formed by the cells which formed by screen printing. However, it is able to use another sensor which is formed by another method. Further, it is able to use a sensor which an electrostatic capacity changes in response to the load.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A load detecting device for a vehicular seat comprising:
    a plurality of load sensors which are disposed in a matrix shape and
    correcting means for setting at least one of the plural load sensors as a standard load sensor and for correcting a level of output values of each load sensor based on the level of the output value of the standard load sensor.

2. A load detecting device for a vehicular seat according to claim 1, wherein the load sensors are formed by printing and the standard load sensor is disposed at approximately a central portion of the matrix shape.

3. A vehicular seat provided with a load detecting device according to claim 1, wherein the correcting means sets as the standard load sensor a load sensor disposed at a central portion of the plural load sensors disposed in the matrix shape.

4. A load detecting device for a vehicular seat comprising:
    a plurality of load sensors which are disposed in a matrix shape including a standard load sensor disposed at a standard line in the matrix shape and
    correcting means for correcting a level of output values of each load sensor based on a level of the output value of the standard load sensor.

5. A load detecting device for a vehicular seat according to claim 4, wherein the load sensors are formed by printing in a row direction of the matrix and the standard line is a line which is disposed at approximately central portion of the matrix shape.

6. A vehicular seat provided with a load detecting device, the load detecting device comprising:
    a plurality of load sensors disposed in a matrix shape and including a standard load sensor disposed at a central portion of the matrix; and
    correcting means for correcting a level of output value of each load sensor based on the level of output value of the standard load sensor.

7. A vehicular seat provided with a load detecting device according to claim 6, wherein the load sensors are formed by printing and the standard load sensor is disposed at approximately a central portion of the matrix shape.

* * * * *